(12) United States Patent
Park

(10) Patent No.: US 9,094,227 B2
(45) Date of Patent: Jul. 28, 2015

(54) POWER MANAGEMENT NETWORK SYSTEM

(75) Inventor: Daehwan Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 13/577,823

(22) PCT Filed: Feb. 11, 2010

(86) PCT No.: PCT/KR2010/000853
§ 371 (c)(1),
(2), (4) Date: Aug. 8, 2012

(87) PCT Pub. No.: WO2011/099660
PCT Pub. Date: Aug. 18, 2011

(65) Prior Publication Data
US 2012/0323384 A1 Dec. 20, 2012

(51) Int. Cl.
*H04L 12/28* (2006.01)

(52) U.S. Cl.
CPC .................................. *H04L 12/2803* (2013.01)

(58) Field of Classification Search
CPC ........ G06F 21/00; G06F 21/60; G06F 21/805
USPC ............. 726/15; 700/295, 286; 713/153, 189; 340/870
See application file for complete search history.

(56) References Cited

U.S. PATENT DOCUMENTS

| | | | |
|---|---|---|---|
| 7,248,978 B2 * | 7/2007 | Ransom ........................... | 702/62 |
| 7,249,265 B2 * | 7/2007 | von Carolsfeld et al. ..... | 713/193 |
| 7,415,725 B2 * | 8/2008 | Henneberry et al. ........... | 726/17 |
| 7,747,534 B2 * | 6/2010 | Villicana et al. ................ | 705/63 |
| 8,068,938 B2 * | 11/2011 | Fujita ............................ | 700/295 |
| 8,325,057 B2 * | 12/2012 | Salter ....................... | 340/870.02 |
| 8,340,832 B1 * | 12/2012 | Nacke et al. .................. | 700/295 |
| 8,447,541 B2 * | 5/2013 | Rada et al. ...................... | 702/60 |
| 8,468,272 B2 * | 6/2013 | Giroti ........................... | 709/249 |
| 8,533,362 B2 * | 9/2013 | Alexander .................... | 709/246 |
| 8,566,590 B2 * | 10/2013 | Oba et al. ...................... | 713/168 |
| 8,666,902 B2 * | 3/2014 | Grisham et al. ................ | 705/63 |
| 8,832,428 B2 * | 9/2014 | Ota et al. ...................... | 713/153 |

(Continued)

FOREIGN PATENT DOCUMENTS

| | | |
|---|---|---|
| KR | 10-2005-0091365 | 9/2005 |
| KR | 20-0434672 | 12/2006 |
| KR | 10-0776338 | 11/2007 |
| KR | 10-2008-0006269 | 1/2008 |

OTHER PUBLICATIONS

Berthier R, Intrusion detection for Advanced Metering Infrastructures, Oct. 2010, IEEE, vol. 8, pp. 350-355.*

*Primary Examiner* — Dede Zecher
*Assistant Examiner* — Viral Lakhia
(74) *Attorney, Agent, or Firm* — McKenna Long & Aldridge LLP

(57) ABSTRACT

A power management network system includes an advanced metering infrastructure (AMI) to communicate with a power supply source to receive power information and an energy management system (EMS) connectable to the AMI to control operations of home appliances on the basis of the power information. A first security table is in at least one of the AMI and the EMS, and the first security table has a security code to encode data with respect to the power information. A security reinforcement unit connectable to the AMI or the EMS includes a second security table to update the first security table.

20 Claims, 13 Drawing Sheets

(56) References Cited

U.S. PATENT DOCUMENTS

| | | | |
|---|---|---|---|
| 2008/0219186 A1* | 9/2008 | Bell et al. | 370/254 |
| 2010/0087959 A1* | 4/2010 | Williams, Jr. | 700/286 |
| 2011/0202195 A1* | 8/2011 | Finch et al. | 700/295 |
| 2012/0124367 A1* | 5/2012 | Ota et al. | 713/153 |
| 2012/0169510 A1* | 7/2012 | Pamulaparthy et al. | 340/870.02 |
| 2013/0145452 A1* | 6/2013 | Ollukaren et al. | 726/15 |
| 2013/0293390 A1* | 11/2013 | Le Buhan et al. | 340/870.02 |

* cited by examiner

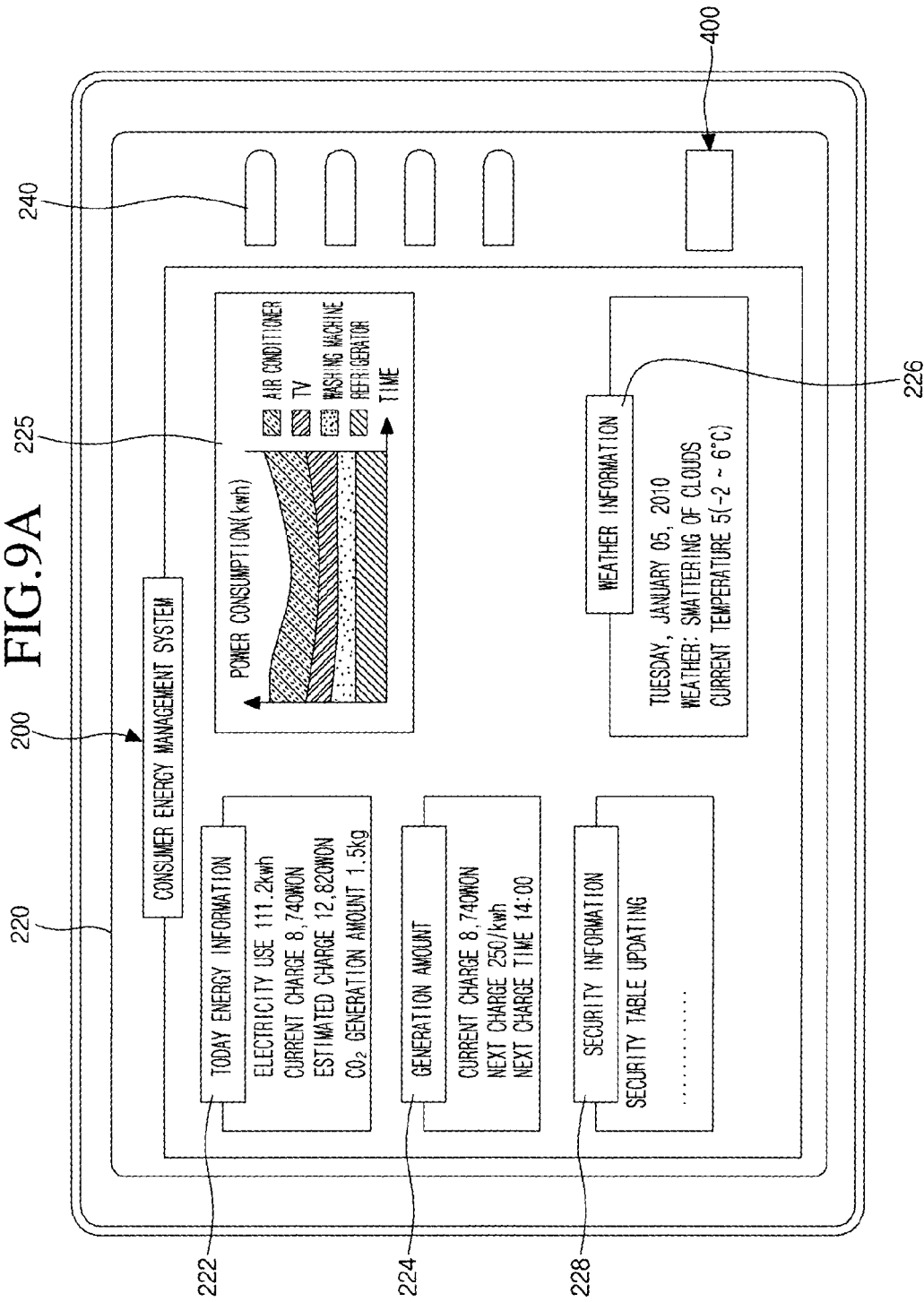

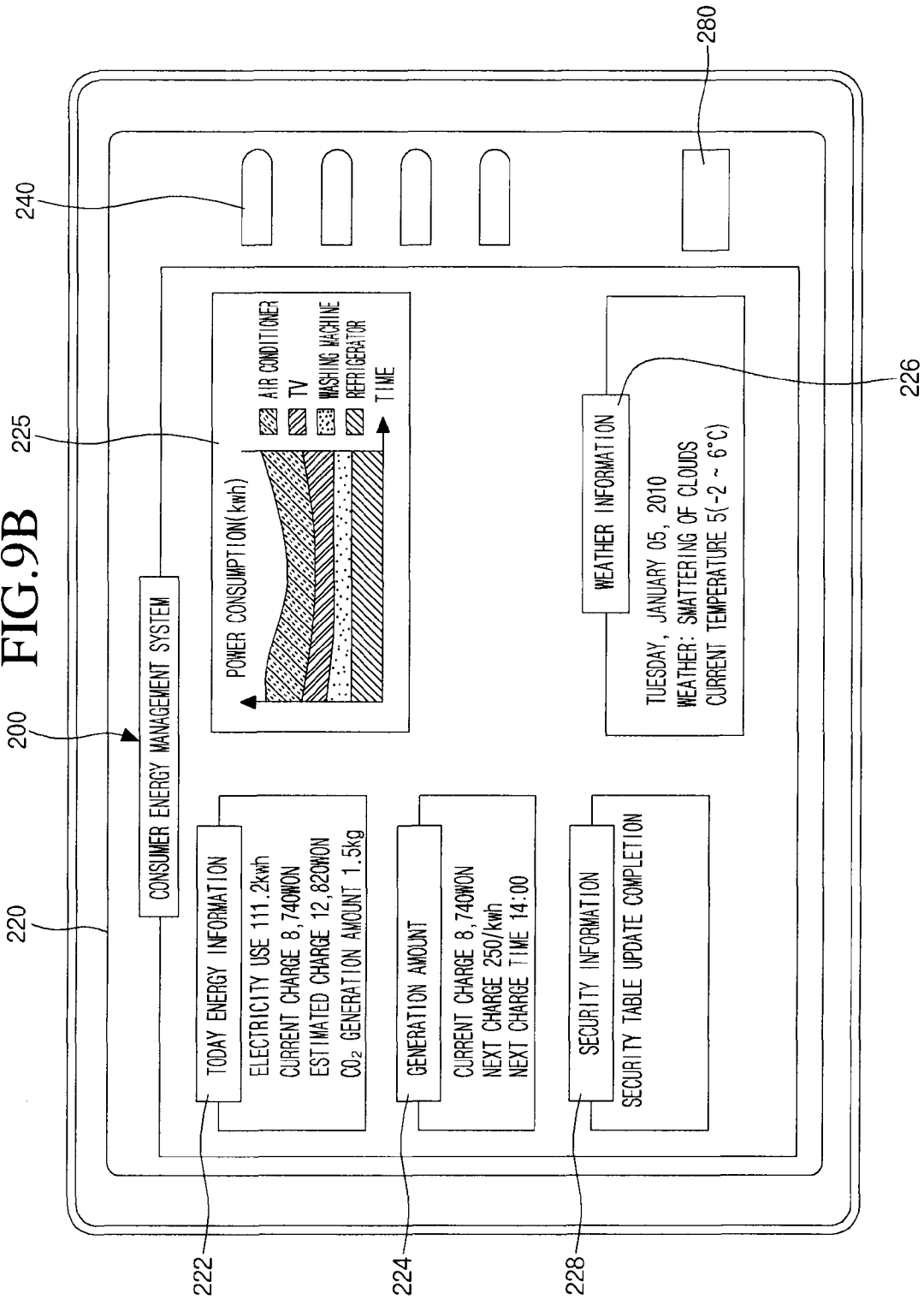

US 9,094,227 B2

POWER MANAGEMENT NETWORK SYSTEM

This application claims the benefit of priority of PCT Application No. PCT/KR2010/000853 filed on Feb. 11, 2010, which is incorporated by reference.

TECHNICAL FIELD

The present disclosure relates to a power management network system having a reinforced security function.

BACKGROUND ART

Generally, electricity is supplied to home appliances from a power plant operated by a public or private company, through a power transmission line, and a power distribution line.

That is, power is supplied not by a distributed structure but by a centralized structure. In other words, power is supplied through a radial structure expanding from the center to the periphery. This is not a customer-centered structure but a supplier-centered one-way structure.

Therefore, residential customers can get only limited information about prices of electricity from a power exchange.

Furthermore, since electricity prices are practically fixed, it is difficult for customers to buy electricity at desired prices.

Thus, much research is being performed on smart grids to solve the above-mentioned problems and use energy efficiently.

A smart grid is a next-generation power and management system developed by applying information technology (IT) to the existing power grid for improving energy efficiency by realizing two-way and real-time information exchange between power providers and consumers.

In addition to unilateral power supply from a power supply source to a network to which home appliances are connected, two-way communication is necessary between the power supply source and the network to realize a smart grid for residential customers.

However, in a case where the two-way communication is performed, external factors may intrude into a communication path to cause a failure of network for power supply.

SUMMARY

Embodiments provide a power management network system in which a security code can be confirmed in a communication process between an advanced metering infrastructure (AMI) connected to a power supply source and an energy management system (EMS) connected to the AMI to prevent external factors from being intruded.

Embodiments also provide a power management network system including a security reinforcement unit selectively mounted on the AMI and EMS to periodically update a security code.

In one embodiment, a power management network system comprises: an advanced metering infrastructure (AMI) to communicate with a power supply source to receive power information; an energy management system (EMS) connectable to the AMI to control operations of home appliances on the basis of the power information; a first security table in at least one of the AMI and the EMS, the first security table having a security code to encode data with respect to the power information; and a security reinforcement unit connectable to the AMI or the EMS, the security reinforcement unit comprising a second security table to update the first security table.

According to the embodiments, the AMI connected to the power supply source and the EMS connected to the home appliances may communicate with each other by confirming the security code to improve stability of the power supply network.

Also, the security reinforcement unit including the security table in which the plurality of security codes are stored may be selectively mounted on the AMI and the EMS. Thus, the security codes may be periodically updated through the security table to further enhance the security.

In addition, since the security reinforcement unit is replaceable, the security may be further improved.

BRIEF DESCRIPTION OF THE DRAWINGS

FIGS. 9A and 9B are views of an EMS display unit in a process in which a security table of the EMS is updated according to an embodiment.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

In advance of description, a smart grid includes a plurality of power plants and a plurality of power generating facilities such as a solar cell station, a wind power plant, and a fuel cell station. Electricity generated by the power plants and power generating facilities are transmitted to a sub-control center.

The sub-control center stores the electricity and transmits the electricity to a substation where the electricity is adjusted in voltage to be distributed to consumers such as residential customers and manufacturing plants.

Figure 1:
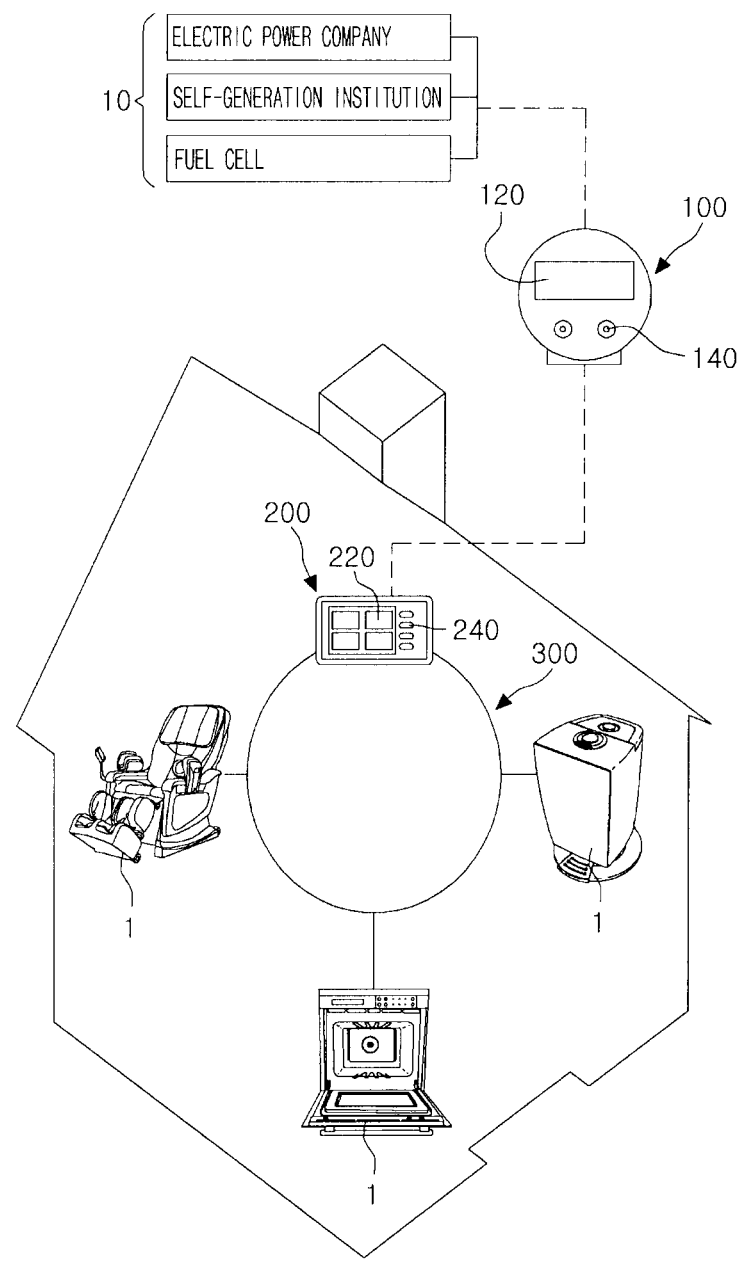
FIG. 1 is a schematic view of a power management network system according to an embodiment.

FIG. 1 is a schematic view of a power management network system according to an embodiment.

Referring to FIG. 1, an amount and charge of electricity supplied from a power supply source 10 including the above-described power plants and power generating facilities may be grasped in real time through an advanced metering infrastructure (AMI) 100 provided in consumers such as residential customers or offices. This will be described in detail below.

The AMI 100 is connected to an energy management system (EMS) 200 which is provided in homes or offices to manage power in real time and predict power consumption in real time.

Here, the AMI 100 of the smart grid is backbone technology for integrating consumers based on an open architecture. The AMI 100 provides consumers with the ability to use electricity efficiently and power providers with the ability to detect problems on their systems and operate them efficiently.

That is, in the smart grid, the AMI 100 provides a reference so that all electric devices can be connected to each other regardless of manufactures of the electric devices, and a real-time price signal of an electricity market is transmitted through the AMI 100 to the EMS 200 provided in a consumer.

In addition, the EMS 200 distributes electricity to a plurality of electric devices provided in the consumer and communicates with the electric devices for detecting power information of the electric devices and performing a power information processing process such as a power consumption or electricity charge limit setting process so as to reduce energy consumption and costs.

For this, the EMS 200 includes an EMS control unit (see FIG. 8) 210, an EMS input unit 240, an EMS communication unit (see FIG. 8) 260, and an EMS display unit 220. This will be described below in detail.

The EMS 200 mainly supplies electricity to home appliances 1 provided in the consumer.

For this, an energy supply network 300 is constructed in the consumer. The energy supply network 300 includes the AMI 100 for real-time measurements of power, electricity rates, power consumption peak times; and the EMS 200 capable of communicating with both the AMI 100 and the home appliances 1 to transmit and receive control signals for distributing electricity to the home appliances 1.

Hereinafter, configurations of the power management network 300 will be described with reference to the accompanying drawing.

Figure 2A:
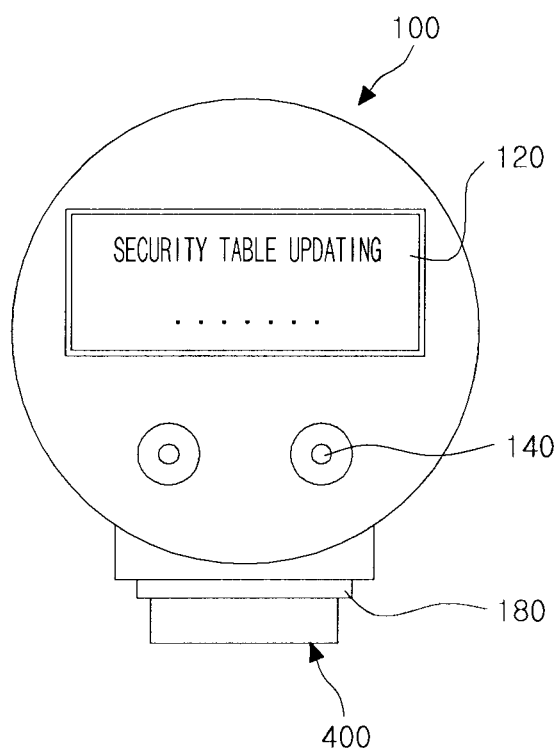
FIGS. 2A and 2B are views of an EMS display unit in a process in which a security table of an AMI is updated according to an embodiment.
Figure 2B:
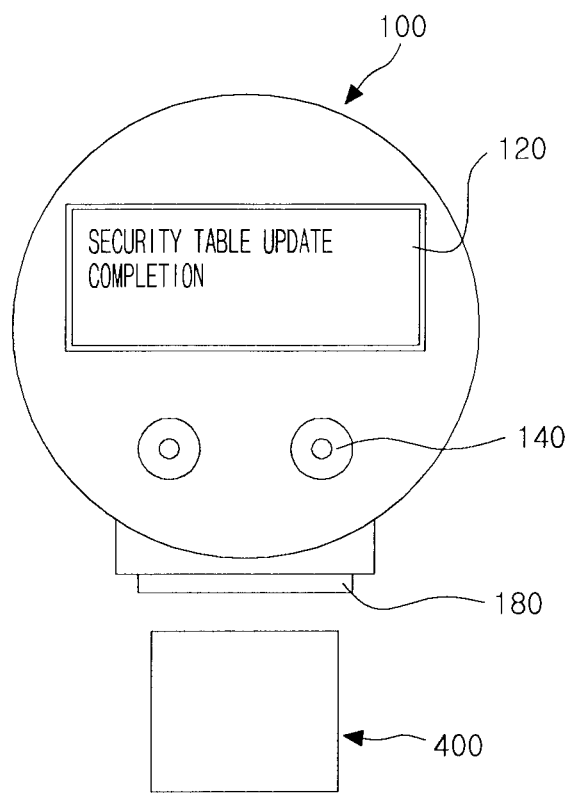
Figure 3A:
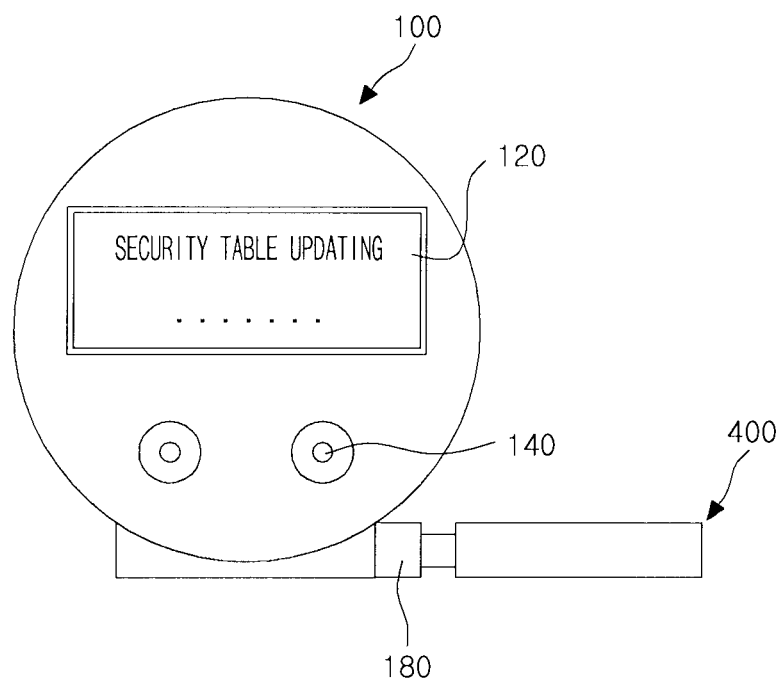
FIGS. 3A and 3B are views of an AMI display unit in a process in which a security table of an AMI is updated according to another embodiment.
Figure 3B:
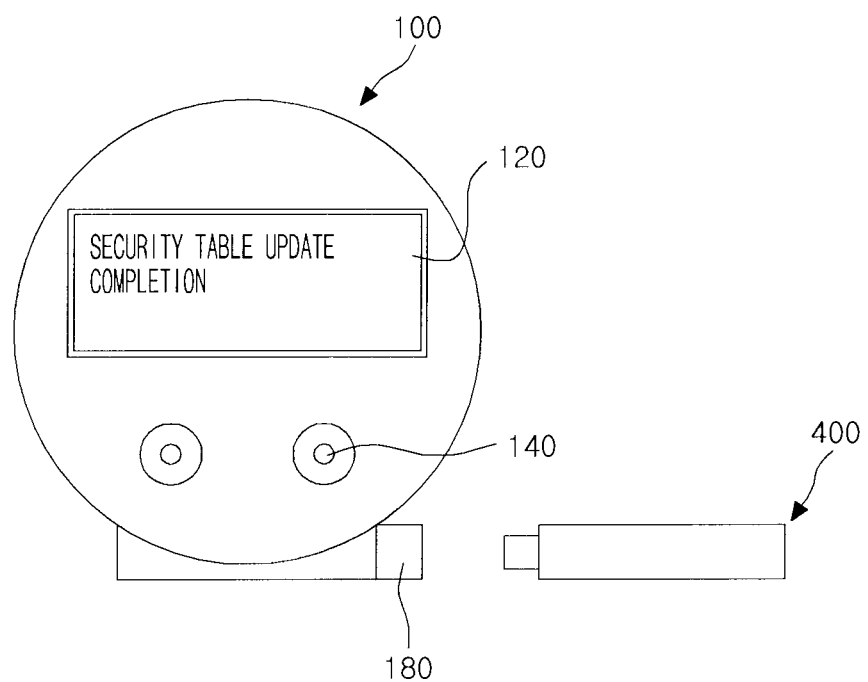
Figure 4:
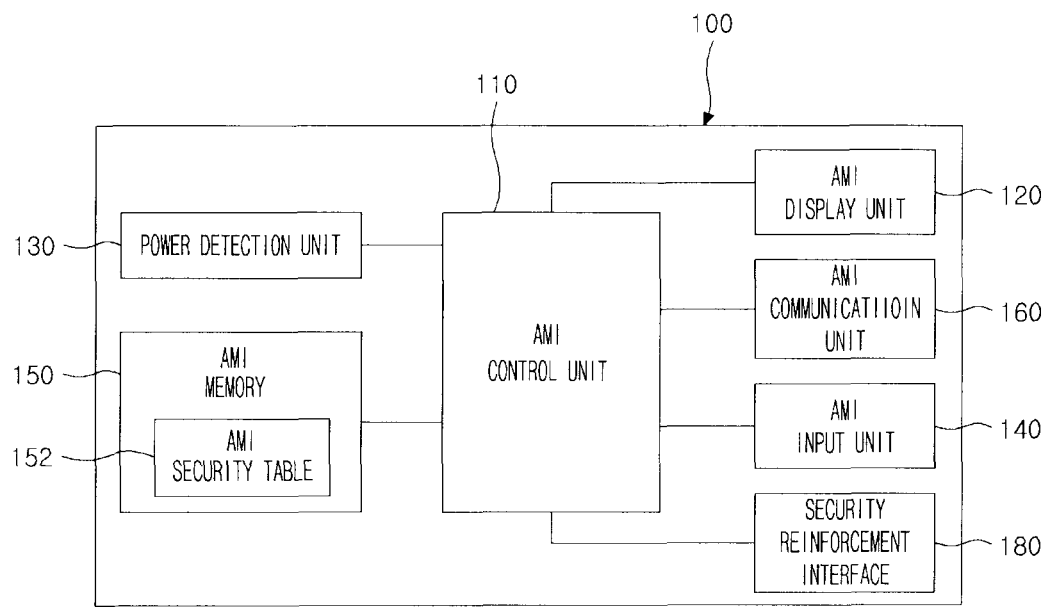
FIG. 4 is a view illustrating a schematic diagram of the AMI according to an embodiment.

FIGS. 2A and 2B are views of an EMS display unit in a process in which a security table of the AMI is updated according to an embodiment. FIGS. 3A and 3B are views of an AMI display unit in a process in which a security table of an AMI is updated according to another embodiment. FIG. 4 is a view illustrating a schematic diagram of the AMI according to an embodiment.

Referring to FIGS. 2A to 4, the AMI 100 includes an AMI memory 150 including a security table 152 for data communication, power charge data, metering data, and a power control program; a power detection unit 130 for detecting current and voltage of an electric wire; and an AMI control unit 110 for calling the data and program stored in the AMI memory 150 to transmit a power control command and perform data communication.

The AMI 100 further includes an AMI display unit 120 and an AMI input unit 140 which receive the command transmitted from the AMI control unit 110 to allow a user to confirm an operation state and input the control command.

In this embodiment, although the AMI display unit 120 and the AMI input unit 140 are separately provided, the present disclosure is not limited thereto. For example, the AMI display unit 120 and the AMI input unit 140 may be provided as a single unit having a touch panel type.

Also, the AMI 100 includes a communication unit 160 which encodes data using the security table 152 stored in the AMI memory 150 to transmit the encoded data and receives encoded data to decode the encoded data.

That is, the AMI 100 encodes power supply information transmitted to the EMS 200 using one of a plurality of security codes provided in the security table 152 and then transmits the encoded data.

In detail, when the power supply information is transmitted from the AMI 100 to the EMS 200, at least two or more AMI tables including security codes, which are arranged in a row and column format, and used on the entire data transmitted to the EMS 200 are provided. Also, when data is transmitted, a data film number including the AMI security table 152 having security codes to be used for encoding and information of security codes disposed in a fixed row and column which are used for encoding are transmitted into the AMI 100.

Also, the security codes stored in the AMI security table 152 transmitted to the EMS 200 are exclusively XOR-operated with data to be transmitted, and then the resultant are combined and encoded.

That is, a security code selected in the AMI security table 152 is exclusively XOR-operated with an address of the data to be transmitted and a file count indicating a data amount transmitted from the address.

Then, when the combination is completed, a header and tail for providing file information are inserted into the data to be transmitted, and the encoded data is transmitted to the EMS 200.

The EMS 200 receives the transmitted encoded data and confirms the header and a check sum of the data, thereby confirming whether the data is normal.

If the confirmed data is normal, the encoded data is XOR-operated to perform a decoding process for separating a final address and a final file count from each other.

In the decoding process, the file number included in the AMI security table 152 transmitted when the data is transmitted is confirmed to confirm security codes corresponding to the fixed row and column. Then, the exclusive XOR operation is performed using the security codes to decode the security codes.

The AMI 100 includes an AMI security reinforcement interface 180 so that a security reinforcement unit 400 including a plurality of encoding tables to be updated is mounted to update the AMI security table 152 by which encoded data communication is enabled.

Here, the AMI security reinforcement interface 180 has a card socket form (see FIGS. 2A and 2B) or a USB port form (see FIGS. 3A and 3B).

The security reinforcement unit 400 is operated in one-to-one correspondence with one AMI 100. For this, when the security reinforcement unit 400 is connected to the AMI 100, a process for confirming a product code of the AMI 100 is performed. This process may be performed through a program included in the security reinforcement unit 400.

Figure 5:
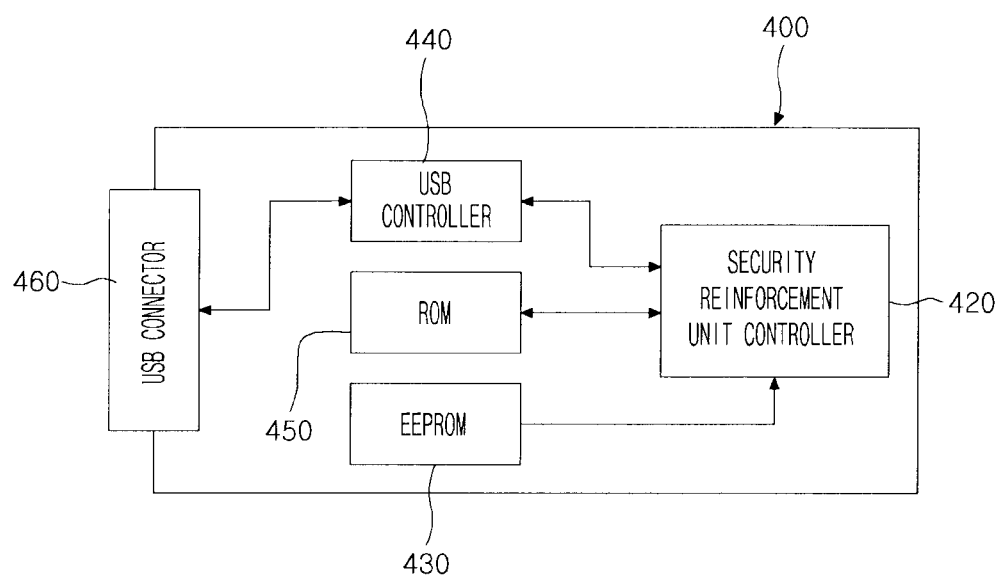
FIG. 5 is a view illustrating a schematic diagram of a security reinforcement unit according to an embodiment.
Figure 6:
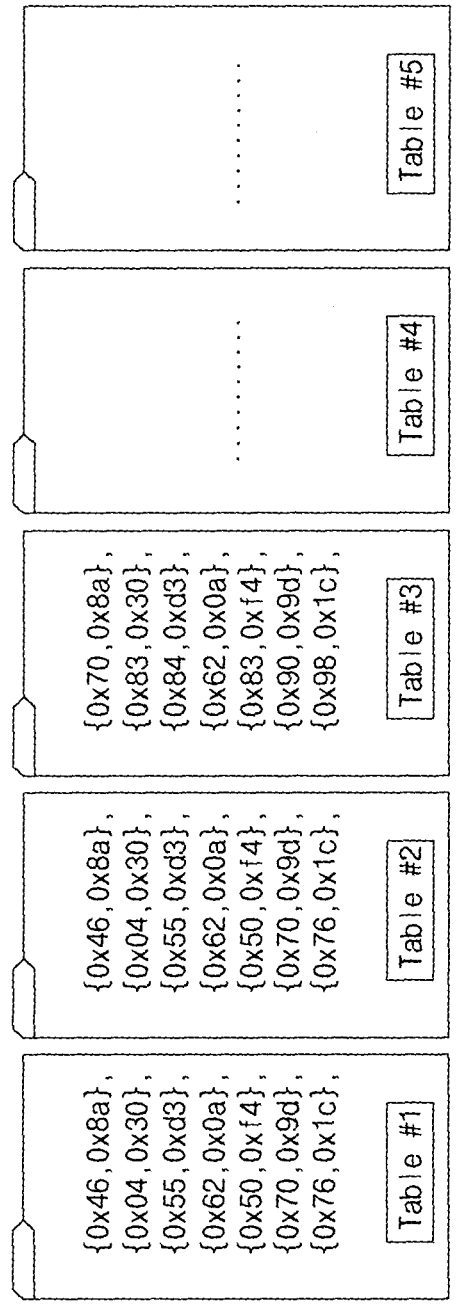
FIG. 6 is a view illustrating an example of a security table stored in the security reinforcement unit of FIG. 5.

FIG. 5 is a view illustrating a schematic diagram of the security reinforcement unit according to an embodiment. FIG. 6 is a view illustrating an example of a security table stored in the security reinforcement unit of FIG. 5.

Referring to FIGS. 5 and 6, the security reinforcement unit 400 includes a USB connector 460 connectable to the AMI security reinforcement interface 180 and a USB controller 440 for operating the USB connector 460.

That is, in this embodiment, the security reinforcement unit 400 and the AMI security reinforcement interface 180 may be connected to each other through a universal serial bus (USB) so that power supply and control signal transmission are enabled.

Also, the security reinforcement unit 400 includes an EEPROM 430 including a plurality of security tables to update the AMI security table 152, a ROM 450 including an executable program to update the AMI security table 152, and a security reinforcement unit controller 420 for controlling the EEPROM 430 and the ROM 450.

In detail, when the USB connector 460 is connected to the AMI security reinforcement interface 180, the security reinforcement unit controller 420 confirms a product code of the AMI 100 to execute a program for updating the AMI security table 152. Also, in the AMI 100, the plurality of tables included in the AMI security table 152 is deleted through the AMI control unit 110.

Here, all security tables of the AMI security table 152 may be deleted. Alternatively, the AMI 100 may be programmed to successively delete portions of the security tables.

The security reinforcement unit controller 420 calls the program for updating the security table from the ROM 450 to execute the program. When the program is executed, the security reinforcement unit 400 transmits the plurality of security tables included in the EEPROM 430 to the AMI memory 150.

Also, the AMI control unit 110 stores the plurality of tables transmitted to the AMI memory 150 in the AMI security table 152 to update the used security table with a new security table.

When the program for updating the AMI security table 152 is executed, a message for informing updating of the security table is displayed through the AMI display unit 120 of the AMI 100.

When the update of the security table is completed, a security table update completion message is displayed so that the security reinforcement unit 400 may be removed.

An update scheduled date may be set in the AMI 100 through the AMI input unit 140.

In detail, a separate setting button for setting an update period of the AMI security table 152 may be provided in the AMI input unit 140. The update period may be changed for a week unit or month unit by the setting button. The update process of the security table may be also executed in the EMS 200.

That is, the EMS 200 may selectively request the power supply to the AMI 100. Here, a power supply request signal is encoded and transmitted.

For this, a separate EMS security table (see FIG. 8) 252 is provided in the EMS 200 to transmit the encoded data to the AMI 100.

Figure 7:
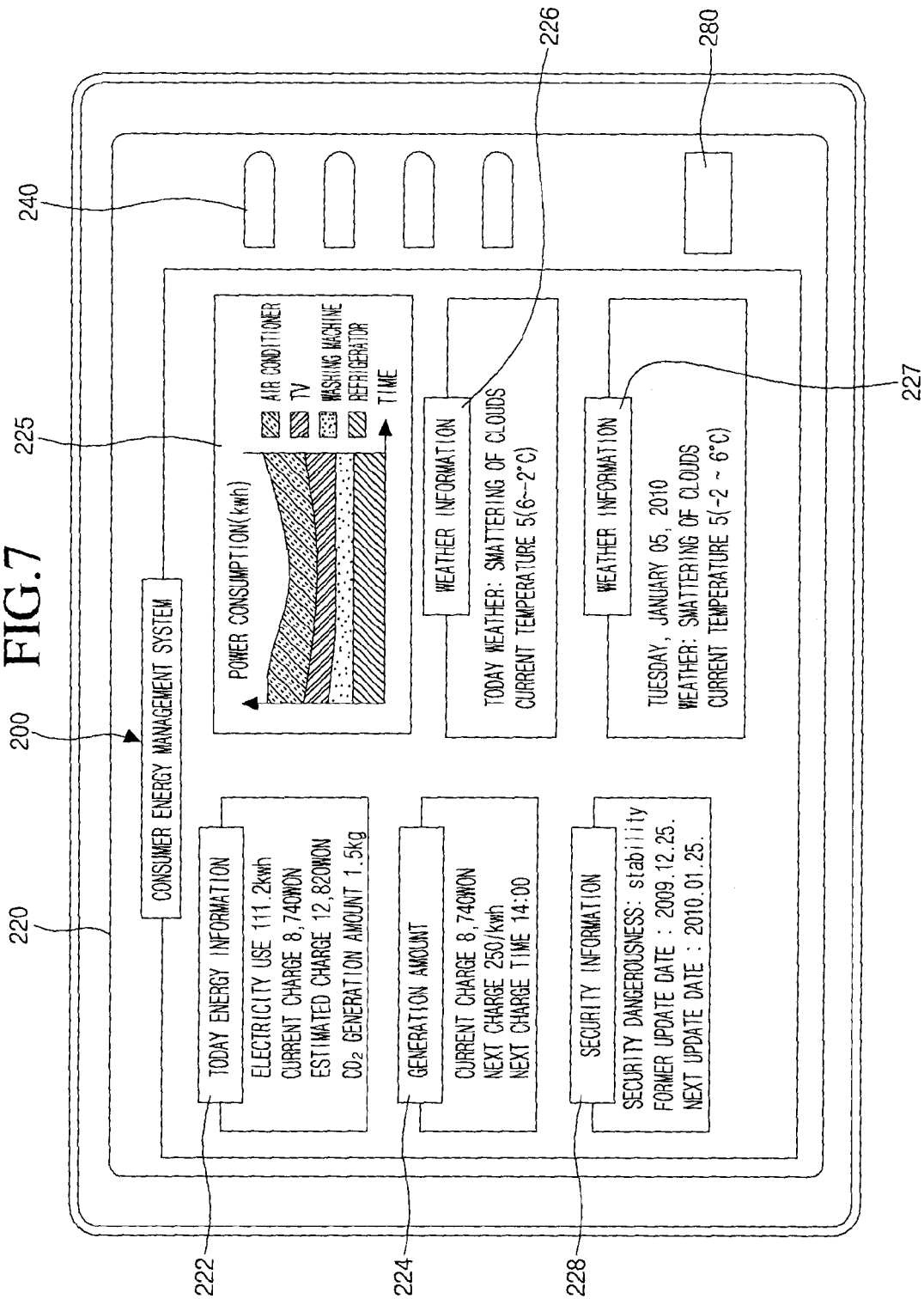
FIG. 7 is a view of an EMS according to an embodiment.
Figure 8:
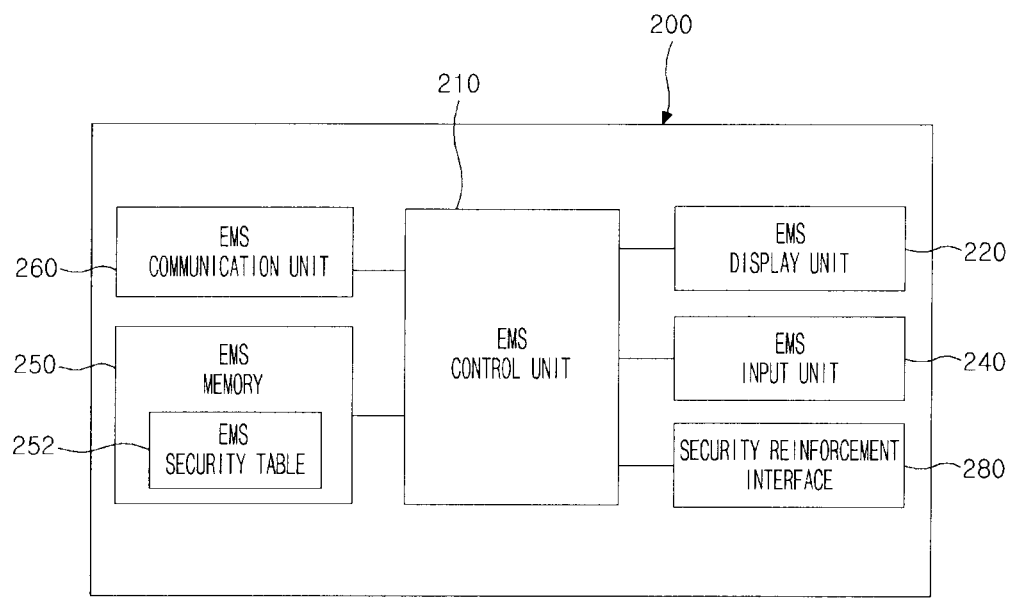
FIG. 8 is a view illustrating a schematic diagram of the EMS according to an embodiment.

FIG. 7 is a view of an EMS according to an embodiment. FIG. 8 is a view illustrating a schematic diagram of the EMS according to an embodiment. FIGS. 9A and 9B are views of an EMS display unit in a process in which a security table of the EMS is updated according to an embodiment.

Referring to FIGS. 7 to 9, the EMS 200 includes an EMS communication unit 260 for communicating with the AMI 100, an EMS input unit 240 and EMS display unit 220 for inputting a control command and displaying a controlled state and user information provision, and an EMS control unit 210 for controlling the EMS communication unit 260, the EMS input unit 240, and the EMS display unit 220.

Like the AMI 100, the EMS 200 includes an EMS memory 250 including an EMS security table 252 for encoding data communication. Also, the EMS 200 further includes an EMS security reinforcement interface 280 connectable to the security reinforcement unit 400 to update the EMS security table 252.

Here, like the AMI security reinforcement interface 180, the EMS security reinforcement interface 280 may have a card socket form or a USB port form.

The EMS display unit 220 displays information related to electricity charge such as an energy information window 222 for displaying an estimated change estimated based on a current electricity consumption amount and an accumulated consumption history and today energy information such as a carbon dioxide generation amount and a real-time energy information window 225 for displaying the current and next electricity charges and a time at which an electricity charge is changed.

Also, the EMS display unit 220 further includes a power consumption window 225 for individually displaying power consumption of the plurality of home appliances 1 connected to the power management network 300 and a weather information window 226 for informing weather information, and a security information window 228 for displaying information related to update of the EMS security table 252.

Here, the former update date and the update scheduled date of the EMS security table 252 are confirmed through the security information window 228 to inform a security danger state when the update scheduled date elapses. The update scheduled date may be inputted for a week unit or month unit through the EMS input unit 240.

Hereinafter, a process of updating the security table of the EMS 200 will be described.

Figure 10:
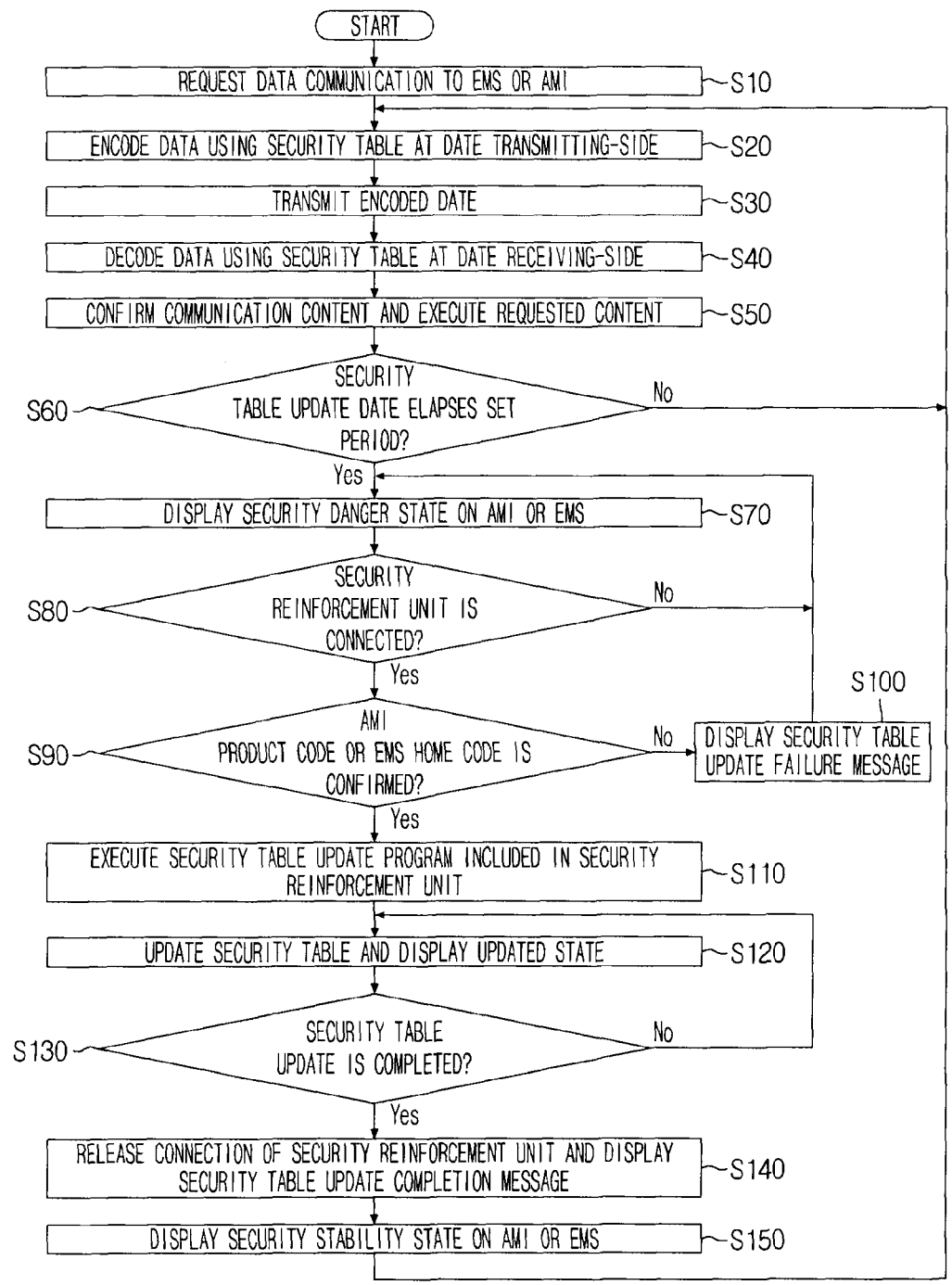
FIG. 10 is a flowchart illustrating a security table update process of a power management network according to an embodiment.

FIG. 10 is a flowchart illustrating a security table update process of a power management network according to an embodiment.

Referring to FIG. 10, the power management network 300 according to an embodiment may perform encoding and decoding processes using the security table to realize stability of transmitting/receiving of data, thereby transmitting the data.

In detail, when data communication is requested from the EMS 200 to the AMI 100 or from the AMI 100 to the EMS 200 (S10), data is encoded using the security table at a data transmission-side (S20).

That is, when the power supply is requested from the AMI 100 to the EMS 200, at least two or more EMS security tables including security codes which are arranged in a row and column format on the entire data transmitted to the AMI 100 are provided. Also, when data is transmitted, a data film number including the EMS security table 252 having security codes to be used for encoding and information of security codes disposed in a fixed row and column which are used for encoding are transmitted to the AMI 100.

Also, the security codes stored in the EMS security table 252 transmitted to the AMI 100 are exclusively OR-operated with data to be transmitted, and then the resultant are combined and encoded.

That is, to request the power supply, a security code selected in the EMS security table 252 is exclusively OR-operated with an address of the data to be transmitted and a file count indicating a data amount transmitted from the address.

When the encoded data is transmitted to the AMI 100 (S30), the security code is confirmed using information of the security code transmitted from the AMI 100. Then, the encoded data is decoded using the confirmed encoding code (S40) to confirm the power supply request signal, thereby supplying power (S50).

Whether an update date of the security table elapses from a set update scheduled date is confirmed through the AMI display unit 120 of the AMI 100 and the EMS display unit 220 of the EMS 200 (S60). Here, the update scheduled date may be set so that the AMI 100 and the EMS 200 have the same update scheduled date or same update scheduled dates different from each other.

When the update scheduled date elapses, a security danger state is displayed on the AMI display unit 120 and the EMS display unit 220 (S70).

Thus, when the user confirms the security danger state, the security table is updated using the security reinforcement unit 400 provided together with the AMI 100 or the security reinforcement unit 400 provided together with the EMS 200 (S80).

Here, the security reinforcement units connected to the AMI 100 and EMS 200 may be separately provided. Alternatively, one security reinforcement unit 400 may be provided to perform the two functions. When one security reinforcement unit 400 is used, a select switch for dividing the AMI 100 from EMS 200 may be further disposed on a side of the security reinforcement unit 400.

When the security reinforcement unit 400 is connected to the AMI security reinforcement interface 180 of the AMI 100, the security reinforcement unit controller 420 confirms a product code of the AMI 100. On the other hand, when the security reinforcement unit 400 is connected to the EMS security reinforcement interface 280 of the EMS 200, the security reinforcement unit controller 420 confirms a home code of the EMS 200 (S90).

Here, when the product code or the home code is not confirmed, the security table update program is not executed by the security reinforcement unit controller 420. Thus, a security table update failure message is displayed through the AMI display unit 120 or the EMS display unit 220 (S100).

On the other hand, after the product code or the home code confirmation is completed, the security table update program is executed through the security reinforcement unit controller 420 to update the AMI security table 152 or the EMS security table 252 of the stored security table (S110).

When the security table is updated, a message for informing updating of the security table may be displayed on the AMI display unit 120 or the EMS display unit 220 (S120). When the update of the security table is completed, an update completion message may be displayed (S130).

The displayed update completion message may be displayed until the connection of the security reinforcement unit 400 is released to induce the release of the connection of the security reinforcement unit 400 by the user (S140). After the connection is released, a security stability state may be displayed on the AMI display unit 120 or the EMS display unit 220 (S150).

In the power management network according to the embodiment, the communication process for supplying power and transmitting the control signal may be encoded by the security codes constituting the security table to block external access.

Also, the security reinforcement unit for updating the security table having the above-described functions through electrical connection may be provided to the AMI and EMS constituting the power management network.

In case where the update scheduled date elapses when the former update data and the update scheduled date of the security table are confirmed, security dangerousness may be informed to the AMI and the EMS through the display units. As a result, the user may periodically update the security table.

Also, since the communication failure due to external factors is easily prevented, the stability of the power management network may be more improved to stably supply the power and transmit the control signal. Thus, the industrial applicability may be very high.

The invention claimed is:

1. A power management network system comprising:
an advanced metering infrastructure (AMI) to communicate with a power supply source to receive power information;
an energy management system (EMS) connectable to the AMI to control operations of home appliances on the basis of the power information;
a first security table in at least one of the AMI and the EMS, the first security table having a security code to encode data with respect to the power information; and
a security reinforcement unit connectable to the AMI or the EMS, the security reinforcement unit comprising a second security table and a program to update the first security table with the second security table,
wherein, when the security reinforcement unit executes the program, at least one portion of the first security table is deleted, and the second security table is transmitted to the AMI or the EMS to update the at least one portion of the first security table that is deleted.

2. The power management network system according to claim 1, wherein the data with respect to the power information is exclusively OR-operated with the security code to transfer the resultant data from one of the AMI and the EMS to the other one of the AMI and the EMS.

3. The power management network system according to claim 1, wherein the first security table comprises:
an AMI security table provided in the AMI to encode the data to be transmitted to the EMS; and
an EMS security table provided in the EMS to encode the data to be transmitted to the AMI.

4. The power management network system according to claim 1, wherein the AMI comprises:
an AMI memory to store the data with respect to the power information and the first security table;
an AMI control unit to call the data with respect to the power information to encode the data, thereby transmitting the encoded data to the EMS; and
an AMI decoding unit to decode the encoded data received from the EMS.

5. The power management network system according to claim 4, wherein the AMI further comprises an input unit for setting an update scheduled date of the first security table.

6. The power management network system according to claim 5, wherein the AMI further comprises a display unit and the AMI controller causes the display unit to display an update state when an update scheduled date arrives.

7. The power management network system according to claim 6, wherein the AMI control unit causes the display unit to display a security danger state when an update scheduled date elapses.

8. The power management network system according to claim 1, wherein the EMS comprises:
an EMS memory to store the data with respect to the power information and the first security table;
an EMS control unit to call the data with respect to the power information to encode the data, thereby transmitting the encoded data to the AMI; and
an EMS decoding unit to decode the encoded data received from the AMI.

9. The power management network system according to claim 8, wherein the EMS further comprises an input for setting an update scheduled date of the first security table.

10. The power management network system according to claim 9, wherein the EMS further comprises a display unit and the EMS control unit causes the display unit to display an update state when an update scheduled date arrives.

11. The power management network system according to claim 10, wherein the EMS control unit causes the display unit to display a security danger state when an update scheduled date elapses.

12. The power management network system according to claim 1, wherein at least one of the AMI and the EMS comprises an interface to mount the security reinforcement unit.

13. The power management network system according to claim 12, wherein the interface is provided in a card socket type or a USB port type.

14. The power management network system according to claim 1, wherein the security reinforcement unit updates the first security table with the second security table on the basis of product information of the AMI or the EMS.

15. The power management network system according to claim 14, wherein the product information of the AMI is a product code of the AMI, and the security reinforcement unit updates the first security table with the second security table if the security reinforcement unit can confirm the product code of the AMI.

16. The power management network system according to claim 14, wherein the product information of the EMS is a home code of the EMS, and the security reinforcement unit updates the first security table with the second security table if the security reinforcement unit can confirm the home code of the EMS.

17. The power management network system according to claim 1, wherein the security reinforcement unit comprises:
an EEPROM in which the second security table is stored;
a ROM having a program to update the first security table; and
a controller to control the EEPROM and the ROM to update the first security tablewith the second security table.

18. The power management network system according to claim 1, wherein, when the first security table is deleted, all of the first security table is deleted, or portions of the first security table are successively deleted.

19. The power management network system according to claim 18, wherein the controller updates all of the deleted first security table with the second security table, or the controller successively update portions of the first security table with the second security table.

20. A power management network system comprising:
an advanced metering infrastructure (AMI) to communicate with a power supply source to receive power information;
an energy management system (EMS) connectable to the AMI to control operations of home appliances on the basis of the power information;
a first security table in at least one of the AMI and the EMS, the first security table having a security code to encode data with respect to the power information; and
a security reinforcement unit connectable to the AMI or the EMS, the security reinforcement unit comprising a second security table to update the first security table,
wherein at least one of the AMI and the EMS comprises a display unit to display a security danger state when an update scheduled date elapses.

* * * * *